United States Patent
Stallmann et al.

(10) Patent No.: US 9,429,359 B2
(45) Date of Patent: Aug. 30, 2016

(54) METHOD FOR DRYING A WET CO2 RICH GAS STREAM FROM AN OXY-COMBUSTION PROCESS

(71) Applicant: ALSTOM Technology Ltd, Baden (CH)

(72) Inventors: Olaf Stallmann, Essenheim (DE); Markus Joerg Weitzel, Ingelheim (DE)

(73) Assignee: ALSTOM Technology Ltd, Baden (CH)

( * ) Notice: Subject to any disclaimer, the term of this patent is extended or adjusted under 35 U.S.C. 154(b) by 409 days.

(21) Appl. No.: 13/940,496

(22) Filed: Jul. 12, 2013

(65) Prior Publication Data

US 2013/0298599 A1 Nov. 14, 2013

Related U.S. Application Data

(63) Continuation of application No. PCT/IB2012/000021, filed on Jan. 10, 2012.

(30) Foreign Application Priority Data

Jan. 13, 2011 (EP) .................................. 11150905

(51) Int. Cl.
*B01D 53/047* (2006.01)
*F25J 3/08* (2006.01)
(Continued)

(52) U.S. Cl.
CPC ............... *F25J 3/08* (2013.01); *B01D 53/261* (2013.01); *F23J 15/06* (2013.01); *F23L 7/007* (2013.01); *B01D 53/002* (2013.01);
(Continued)

(58) Field of Classification Search
None
See application file for complete search history.

(56) References Cited

U.S. PATENT DOCUMENTS 4,711,645 A * 12/1987 Kumar ................. B01D 53/047
95/122
4,952,223 A * 8/1990 Kirshnamurthy ...... F25J 3/0266
62/626

(Continued)

FOREIGN PATENT DOCUMENTS

EP 1 226 860 7/2002
RU 2135273 C1 8/1999

(Continued)

*Primary Examiner* — Duane Smith
*Assistant Examiner* — Phillip Shao
(74) *Attorney, Agent, or Firm* — Cynthia W. Flanigan

(57) ABSTRACT

A method for drying a wet $CO_2$ rich gas stream from an oxy-combustion process that includes: compressing the wet $CO_2$ rich gas stream to a drying process operating pressure, cooling the wet $CO_2$ rich gas stream in at least one cooler, alternately drying the wet $CO_2$ rich gas stream in at least one dryer which contains at least one desiccant bed and regenerating the desiccant bed by conducting a heated regenerating gas through the dryer in opposite direction to the flow direction of the wet $CO_2$ rich gas stream, separating the dried $CO_2$ rich gas stream in a purification process to a purified $CO_2$ gas stream and a waste gas stream rich in nitrogen and oxygen, whereby the waste gas stream rich in nitrogen and oxygen is used as regenerating gas, and subsequently to the regeneration the dryer is purged at least once by a pressurized $CO_2$ rich gas stream conducted from the compressor, and whereby the dryer is charged up to the drying process operating pressure with a pressurized $CO_2$ rich gas stream conducted from the compressor before each drying process.

9 Claims, 2 Drawing Sheets

(51) Int. Cl.
*B01D 53/26* (2006.01)
*F23J 15/06* (2006.01)
*F23L 7/00* (2006.01)
*B01D 53/00* (2006.01)
*B01D 53/04* (2006.01)

(52) U.S. Cl.
CPC ........ *B01D 53/047* (2013.01); *B01D 53/0462* (2013.01); *B01D 2256/22* (2013.01); *B01D 2257/102* (2013.01); *B01D 2257/104* (2013.01); *B01D 2257/302* (2013.01); *B01D 2257/602* (2013.01); *B01D 2259/402* (2013.01); *B01D 2259/4009* (2013.01); *B01D 2259/40054* (2013.01); *B01D 2259/40081* (2013.01); *F23J 2219/60* (2013.01); *F23J 2219/70* (2013.01); *Y02E 20/344* (2013.01); *Y02E 20/363* (2013.01)

(56) References Cited

U.S. PATENT DOCUMENTS

| | | |
|---|---|---|
| 2007/0031302 A1 | 2/2007 | Wittrup et al. |
| 2007/0231244 A1* | 10/2007 | Shah ........................ C01B 31/20 423/437.1 |
| 2007/0232706 A1 | 10/2007 | Shah et al. |
| 2010/0024476 A1 | 2/2010 | Shah |
| 2010/0024640 A1 | 2/2010 | Blouin |
| 2011/0005389 A1* | 1/2011 | Webley .............. B01D 53/0476 95/26 |

FOREIGN PATENT DOCUMENTS

| | | |
|---|---|---|
| TW | 200840636 | 10/2008 |
| WO | 2007/106958 | 9/2007 |
| WO | 2009/071816 | 6/2009 |
| WO | 2009/126607 | 10/2009 |
| WO | 2010/103680 | 9/2010 |

* cited by examiner

METHOD FOR DRYING A WET CO2 RICH GAS STREAM FROM AN OXY-COMBUSTION PROCESS

CROSS-REFERENCE TO RELATED APPLICATIONS

This application claims priority to PCT/IB2012/000021 filed Jan. 10, 2012, which claims priority to European Application 11150905.5 filed Jan. 13, 2011, both of which are hereby incorporated in their entireties.

BACKGROUND

The present disclosure relates to a method for drying a wet $CO_2$ rich gas stream from an oxy-combustion process, in particular to a drying method with an adsorption process using a desiccant (adsorbent) and regenerating this adsorbent.

A wet CO2 rich gas stream from an oxy-combustion process has to be treated in order to remove H2O during or after a first compression step. The moisture of the wet CO2 rich gas stream has to be limited due to the need to avoid the formation of solid hydrates or a corrosive, free water phase during the downstream separation or injection process. For such a drying step or process, at least one vessel containing at least one desiccant for adsorbing the moisture from the wet CO2 rich gas stream passing the desiccant in one direction is typically used. For desiccant regeneration the flow through the desiccant bed is provided in the reverse direction. Typical installations foresee two dryers, where one is in operation whilst the other is in standby, respectively in regeneration mode.

Document WO 2009/071816 A2 discloses a method for drying a gas rich in carbon dioxide at high pressure, in which the gas rich in carbon dioxide is cleaned in an adsorption drying unit, comprising at least two bottles of adsorbent operating in a cycle in which one bottle is supplied with gas rich in carbon dioxide for drying whilst another bottle is pressurized and regenerated by means of a flow of dry gas produced by the drying unit, the drying unit producing at least one dry gas rich in carbon dioxide on the first pressurisation of at least one bottle, during which a pressurised gas other than a product from the drying unit is provided to the bottle.

It can be seen as disadvantageous from this known method that the produced dry gas rich in carbon dioxide is used as regeneration gas and after regeneration the gas is discharged to the atmosphere. This causes a disadvantageous loss of CO2. On the other hand recycling of the CO2 leads to disadvantageous increased power demand for compression.

SUMMARY

The above drawbacks and deficiencies are overcome or alleviated by a method for drying a wet CO2 rich gas stream from an oxy-combustion process, the method comprising: compressing the wet CO2 rich gas stream to a drying process operating pressure, cooling the wet CO2 rich gas stream in at least one cooler, alternately drying the wet CO2 rich gas stream in at least one dryer which contains at least one desiccant bed and regenerating the desiccant bed by conducting a heated regenerating gas through the dryer in opposite direction to the flow direction of the wet CO2 rich gas stream, separating the dried CO2 rich gas stream in a purification process to a purified CO2 gas stream and a waste gas stream rich in nitrogen and oxygen, whereby the waste gas stream rich in nitrogen and oxygen is used as regenerating gas, and subsequently to the regeneration the dryer is purged at least once by a pressurized CO2 rich gas stream conducted from the compressor, and whereby the dryer is charged up to the drying process operating pressure with a pressurized CO2 rich gas stream conducted from the compressor before each drying process. Other advantageous embodiments of the invention can be seen from the appended claims.

The present method provides a method for drying a wet $CO_2$ rich gas stream from an oxy-combustion process having low $CO_2$ losses and an energetically high efficiency. More specifically, the method for drying a wet CO2 rich gas stream from an oxy-combustion process offers the following advantages:

Less CO2 losses since a gas stream with low CO2 content is taken for the regeneration of the desiccant in the dryer, The energetic consumption during the drying and regeneration process is reduced.

BRIEF DESCRIPTION OF THE DRAWINGS

Other features and advantages of the invention will become apparent from the following description of embodiments of the invention given by way of non-limiting examples only, and with reference to the accompanying drawings, in which.

DETAILED DESCRIPTION

A wet CO2 rich gas stream from an oxy combustion process has to be treated in order to remove H2O during or after a first compression step. The moisture of the wet CO2 rich gas stream has to be limited due to the need to avoid the formation of solid hydrates or a corrosive, free water phase during the downstream separation or injection process of the CO2 purification process.

Figure 1:
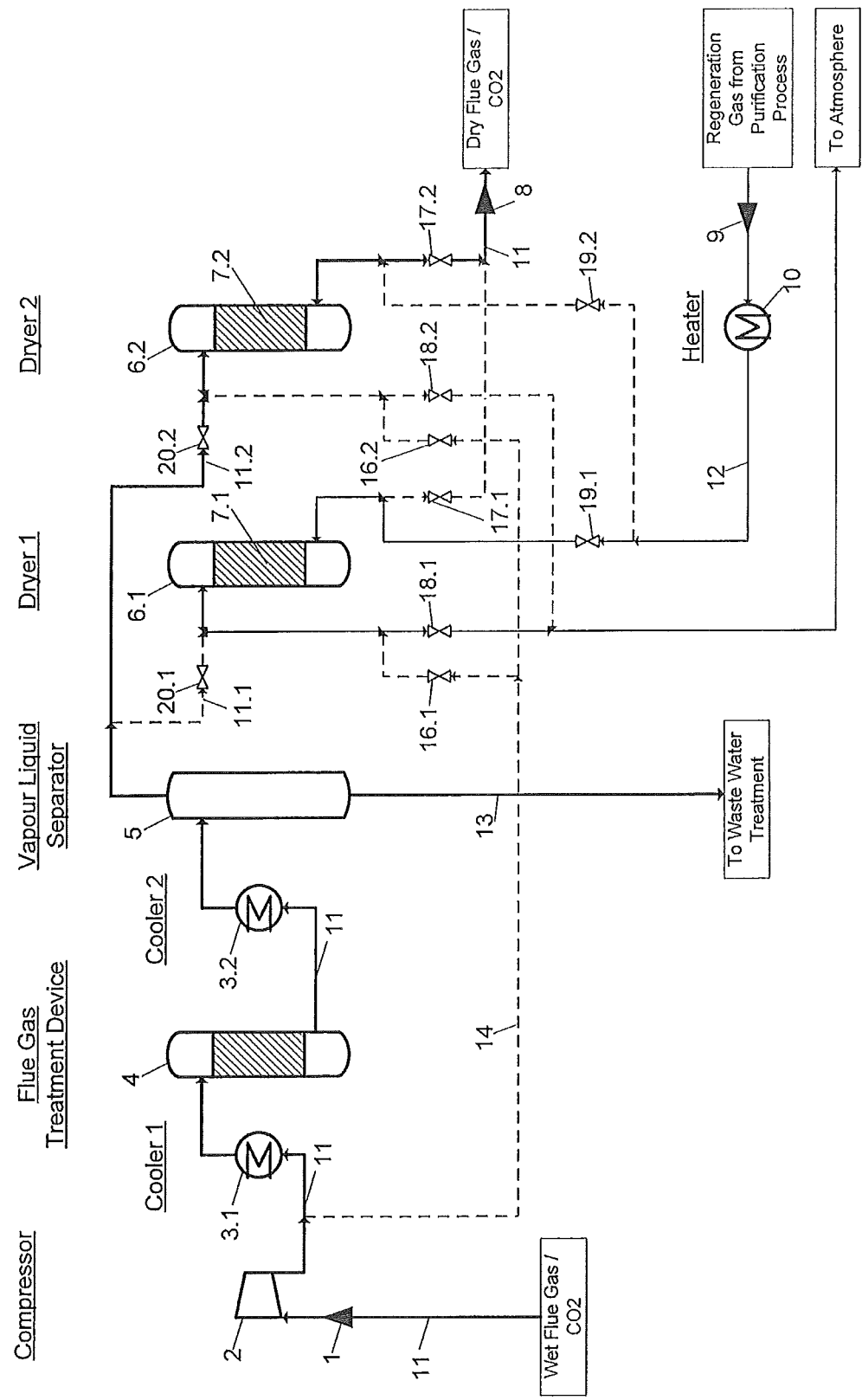
FIG. 1 is a schematic diagram of a method for drying a wet $CO_2$ rich gas stream from an oxy-combustion process according to a first embodiment.

According to FIG. 1 the wet CO2 rich gas stream 1, which gas stream can also be designated as a flue gas stream coming in hot condition from an oxy-combustion process is conducted via line 11 to a compressor 2 and the gas is compressed therein to a drying process operating pressure which lies preferably between 10 to 60 bar. The compressor 2 usually possesses multiple compression stages and therefore it is also possible to install the drying unit 6.1, 6.2 at an intermediate compression stage. Most preferably the pressure as drying process operating pressure is selected in the range of 25 to 55 bar. Thus, it is possible to minimize the water load to the drying process by a condensation step between the compression stage discharge 2 and the dryer 6.1, 6.2. In the embodiment of the invention shown in FIG. 1 the hot gas stream 1 downstream of the compressor 2 is conducted (via line 11) and cooled in at least one cooler, preferably in two coolers 3.1 and 3.2. Further and preferably, a flue gas treatment device 4 located downstream of the cooler 3.1 for removing of Hg, SOx, dust and the like as well as preferably a vapour liquid separator 5 located downstream of the cooler 3.2 to separate condensed moisture from the gas stream and a liquid outlet via a line 13 leading to a waste water treatment (not shown) are arranged. The provision of the flue gas treatment device 4 is extending the lifetime of the desiccant 7.1, 7.2 located in the dryer 6.1, 6.2 while the provision of the vapour liquid separator 5 will help to reduce the size of the dryer 6.1, 6.2.

Downstream of the cooler 3.1, 3.2 preferably two dryers 6.1, 6.2 are arranged for drying the wet $CO_2$ rich gas stream 1. Each dryer contains at least one fixed bed of desiccant 7.1, 7.2 for adsorbing the moisture of the wet $CO_2$ rich gas stream 1. According to the invention each dryer 6.1, 6.2 works alternately in a drying mode and in a regenerating mode. In the drying mode the wet $CO_2$ rich gas stream 1 is dried by the desiccant 7.1, 7.2 and in the regenerating mode the desiccant 7.1, 7.2 is regenerated by a regeneration gas stream 9. According to FIG. 1 dryer 6.2 is in drying mode and dryer 6.1 is in regeneration mode or in stand-by mode. Therefore, if two or more dryers 6.1, 6.2 are used then the dryers are arranged preferably in parallel to use them as described before. The valves 20.1, 20.2 and 17.1, 17.2 will be opened and/or closed accordingly.

Another preferable embodiment of the invention provides an arrangement having two dryers 6.1, 6.2 in series operation (not shown in the figures) with provisions to change the sequence in which the dryers 6.1, 6.2 are passed by the $CO_2$ rich gas stream 1 to prevent water breakthrough into the downstream system. In such arrangements the dryer 6.1, 6.2 being passed first by the $CO_2$ rich gas stream 1 is then also reaching its adsorption capacity first. This dryer 6.1, 6.2 will be taken out of operation by bypassing it, then being regenerated and put back into operation with the changed sequence, that does mean the regenerated dryer 6.1, 6.2 is being passed by the $CO_2$ rich gas stream 1 as second.

Downstream of the dryers 6.1, 6.2 the dried $CO_2$ rich gas stream (dried flue gas stream) 8 underlies a purification process (not shown) where the dried $CO_2$ rich gas stream 8 is separated to an almost pure $CO_2$ gas stream and a waste gas stream containing high amounts of nitrogen and oxygen.

According to the invention the waste gas containing nitrogen and oxygen is used as regeneration gas 9 and conducted via a line 12 to the dryer 6.1, 6.2 in the opposite flow direction compared to the flow direction of the wet $CO_2$ rich gas stream 1 and during the regenerating mode of the dryers 6.1, 6.2 for desorbing the moisture of the desiccant 7.1, 7.2. Before the regeneration gas stream 9 is brought to the dryers 6.1, 6.2 it is heated up to a temperature of preferable more than 160° C. and less than 300° C. by a heater 10. The regeneration gas stream 9 uses a lower pressure than the wet $CO_2$ rich gas stream 1 during the drying mode. The regeneration process has a periodic recurrence, but the cycle time depends on the desiccant 7.1, 7.2 (adsorbent) and the moisture content of the wet $CO_2$ rich gas stream 1.

Figure 2:
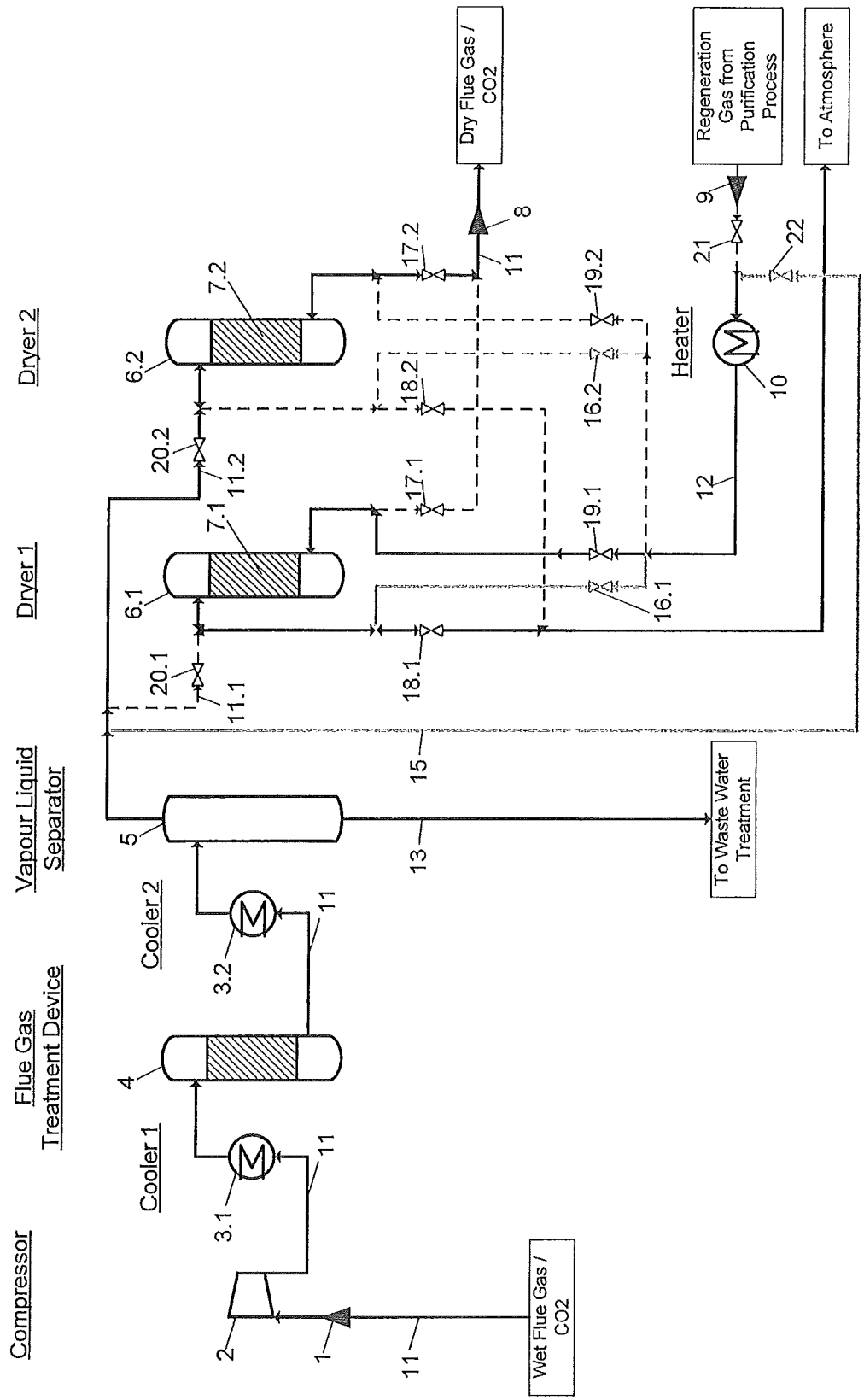
FIG. 2 is a schematic diagram of a method for drying a wet $CO_2$ rich gas stream from an oxy-combustion process according to a second embodiment.

According to the invention the dryer 6.1, 6.2 is purged or cleaned at least once by a $CO_2$ rich gas stream after the regeneration of the desiccant 7.1, 7.2 and which purging gas stream is taken from the outlet of compressor 2. Purging of the dryer 6.1, 6.2 is done by partly pressurization with the $CO_2$ rich gas stream followed by depressurization of the dryer 6.1, 6.2 to atmosphere or back into the upstream process or drying process respectively. The purging has to be done to reduce the content of inert gases like nitrogen entrained by the regeneration gas stream 9 into the dryer 6.1, 6.2. According to FIG. 1 the $CO_2$ rich gas stream is taken preferably directly from the outlet of compressor 2 (upstream of the coolers 3.1, 3.2) via line 14. According to another preferred embodiment and shown in FIG. 2 the $CO_2$ rich gas stream for purging the dryer 6.1, 6.2 is taken downstream of the cooler 3.1, 3.2 via line 15 and heated in the heater 10 up to at least 80° C. before the $CO_2$ rich gas stream is brought for purging to the dryer 6.1, 6.2. By heating up the $CO_2$ rich gas stream to the before-said temperature solid $CO_2$ formation caused by expansion of the gas into the dryer vessel, having the pressure of the regeneration gas, is avoided.

In order to take back the dryer 6.1, 6.2 in operation and according to the invention the pressure in the dryer 6.1, 6.2 will be increased up to the drying process operating pressure with a $CO_2$ rich gas stream after the regeneration process and/or purging process. According to FIG. 1 the $CO_2$ rich gas stream for increasing the pressure in the dryer 6.1, 6.2 is taken preferably directly from the outlet of compressor 2 (upstream of the coolers 3.1, 3.2) via line 14. According to another preferred embodiment and shown in FIG. 2 the $CO_2$ rich gas stream for increasing the pressure in the dryer 6.1, 6.2 is taken downstream of the cooler 3.1, 3.2 via line 15 and heated in the heater 10 before the $CO_2$ rich gas stream is brought to the dryer 6.1, 6.2. Therefore, a hot $CO_2$ rich gas stream (either heated by the compressor 2 or by heater 10) is used for charging the dryer 6.1, 6.2.

By charging the dryer 6.1, 6.2 before the drying process according to the invention pressure surges during the switchover between the regeneration process and the drying process will be prevented because pressure surges can lead to damages like compacting/crushing of the dryer bed (desiccant bed) or bed lifting, in case of upward pressurizing flow, as well as a possible shut down of the compressor 2 or disturbances in the process. Therefore, at least one valve 16.1, 16.2 in the inlet and at least one valve 17.1, 17.2 in the outlet piping (or directly attached on the dryer 6.1, 6.2) is provided to decrease and/or increase the pressure in the dryer 6.1, 6.2. A common method to decrease the pressure or to relief the dryer 6.1, 6.2 respectively is, that the contained gas will be send via a valve 18.1, 18.2 to the atmosphere. This also is done with the charged regeneration gas. This operation will be done if the normal feed and product line is blocked.

By using a hot $CO_2$ rich gas stream according to the invention for charging the dryer 6.1, 6.2 instead of using a dried but cold $CO_2$ stream from a dryer 6.1, 6.2 thermal stresses in the used material of the dryer 6.1, 6.2 and in the desiccant 7.1, 7.2 are prevented. By using the hot gas stream according to the invention low temperatures with dry ice formation (in worst case) after the adiabatic expansion into the dryer 6.1, 6.2 can be prevented because the expanded hot gas stream has also a lower but not too cold temperature. The temperature of the hot $CO_2$ rich gas stream depends from the compression relation of the compressor 2 and lies preferably between 80-140° C. Otherwise, when the $CO_2$ rich gas stream is heated in the heater 10 then it is heated up preferably to at least 80° C. before the $CO_2$ rich gas stream is brought for charging to the dryer 6.1, 6.2.

For the first pressurization or charging of the dryer 6.1, 6.2 after erection of the system no special installations have to be foreseen. This is preferably achieved by ensuring that all desiccants beds 7.1, 7.2 of all dryer 6.1, 6.2 necessary for adsorption operation are open to the compressor 2 at compressor start-up, that does mean that the appropriate valves are open.

According to the operating mode (drying, regeneration, purging, charging or stand-by) of the dryer 6.1, 6.2 the valves 16.1, 16.2, 17.1, 17.2, 18.1, 18.2, 19.1, 19.2, 20.1, 20.2, 21 and 22 are either opened or closed. For example, during the drying process valves 20.2 and 17.2 of dryer 6.2 (or valves 20.1 and 17.1 of dryer 6.1) are open, all other valves of dryer 6.2 are closed. During the regeneration process valves 21 (exists only according the example of FIGS. 2), 19.2 and 18.2 of dryer 6.2 (or valves 19.1 and 18.1 of dryer 6.1) are opened, all other valves of dryer 6.2 are closed (including valve 22 which exists only according the example of FIG. 2). During the purging process valves 22 (exists only according the example of FIGS. 2) and 16.2 of dryer 6.2 (or valve 16.1 of dryer 6.1) are opened and closed after a certain pressure level, preferably 10 to 15 bar is reached. Then the valve 18.2 (or valve 18.1 of dryer 6.1) is opened to depressurize the system once again. This sequence can be repeated in case that impurity levels are still too high. Otherwise, charging of the dryer 6.1, 6.2 can be initiated by opening of valves 22 (exists only according the example of FIGS. 2) and 16.2 of dryer 6.2 (or valve 16.1 of dryer 6.1), all other valves of dryer 6.2 are closed (including valve 21 which exists only according the example of FIG. 2). When the pressure level in the dryer 6.1, 6.2 has reached the drying process operating pressure level the line 11.2 with its process valves 20.2 and 17.2 of dryer 6.2 (or line 11.1 with its valves 20.1 and 17.1 of dryer 6.1) can be opened to put the respective dryer back into adsorption operation, that does mean drying operation.

The drying and regenerating process according the invention provides a best solution with respect to energetic consumption and also low CO2 losses.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for drying a wet $CO_2$ rich gas stream from an oxy-combustion process, the method comprising:
   compressing the wet $CO_2$ rich gas stream to a drying process operating pressure,
   cooling the wet $CO_2$ rich gas stream in at least one cooler,
   alternately drying the wet $CO_2$ rich gas stream in at least one dryer which contains at least one desiccant bed and regenerating the desiccant bed by conducting a heated regenerating gas through the dryer in opposite direction to the flow direction of the wet $CO_2$ rich gas stream,
   separating the dried $CO_2$ rich gas stream in a purification process to a purified $CO_2$ gas stream and a waste gas stream rich in nitrogen and oxygen,
   whereby the waste gas stream rich in nitrogen and oxygen is used as regenerating gas,
   and subsequently to the regeneration the dryer is purged at least once by a pressurized $CO_2$ rich gas stream conducted from a compressor,
   and whereby the dryer is charged up to the drying process operating pressure with the pressurized $CO_2$ rich gas stream conducted from the compressor before each drying process.

2. The method according to claim 1, wherein the drying process operating pressure is between 10 to 60 bar.

3. The method according to claim 1, wherein the pressure of the regenerating gas during the regenerating process lies below the drying process operating pressure.

4. The method according to claim 1, wherein the pressurized $CO_2$ rich gas stream for purging the dryer is taken directly downstream from the compressor and fed directly to the dryer.

5. The method according to claim 1, wherein the pressurized $CO_2$ rich gas stream for charging the dryer before each drying process is taken directly downstream from the compressor and fed directly to the dryer.

6. The method according to claim 1, wherein Hg and/or SOx and/or dust contained in the wet $CO_2$ rich gas stream is removed by a flue gas treatment device located upstream of the dryer.

7. The method according to claim 1, wherein a portion of vapour contained in the wet $CO_2$ rich gas stream is condensed and discharged by a vapour liquid separator located upstream of the dryer.

8. The method according to claim 1, wherein the regenerating gas stream is heated by a heater to a temperature of 160 to 300° C.

9. The method according to claim 1, wherein for drying the wet $CO_2$ rich gas stream two or more dryers are used and arranged in parallel to each other and whereby one dryer is in drying mode and the other(s) is/are in regeneration mode or in stand-by mode.

* * * * *